Nov. 24, 1925.  
H. J. WEETH  
TRUCK BODY  
Filed July 29, 1919

H. J. WEETH 1,563,244

TRUCK BODY

Filed July 29, 1919

H. J. WEETH 1,563,244

TRUCK BODY

Filed July 29, 1919

H. J. Weeth, Inventor

Witness

By C. A. Snow & Co.

Attorneys

Patented Nov. 24, 1925.

1,563,244

UNITED STATES PATENT OFFICE.

HARVEY J. WEETH, OF SPRINGFIELD, NEBRASKA.

TRUCK BODY.

Application filed July 29, 1919. Serial No. 314,006.

*To all whom it may concern:*

Be it known that I, HARVEY J. WEETH, a citizen of the United States, residing at Springfield, in the county of Sarpy and State of Nebraska, have invented a new and useful Truck Body, of which the following is a specification.

This invention relates to improvements in vehicles, and more particularly to the construction of the body thereof.

The primary object of the invention is to provide a removable body, to meet the various demands of transportation, and more particularly to a body adapted for transporting cattle.

A further object of the invention is to provide a removable body of this character which may be easily and quickly removed from the permanent body on which the same is supported, and one which will be rigidly and securely supported thereon, when the same is to be put into use.

A still further object of the invention is to provide a removable body of this character, having a stanchion forming a part thereof, whereby the animals may be held in a predetermined position within the removable body, thereby preventing crowding of the animals transported therein.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawings:—

Figure 1:
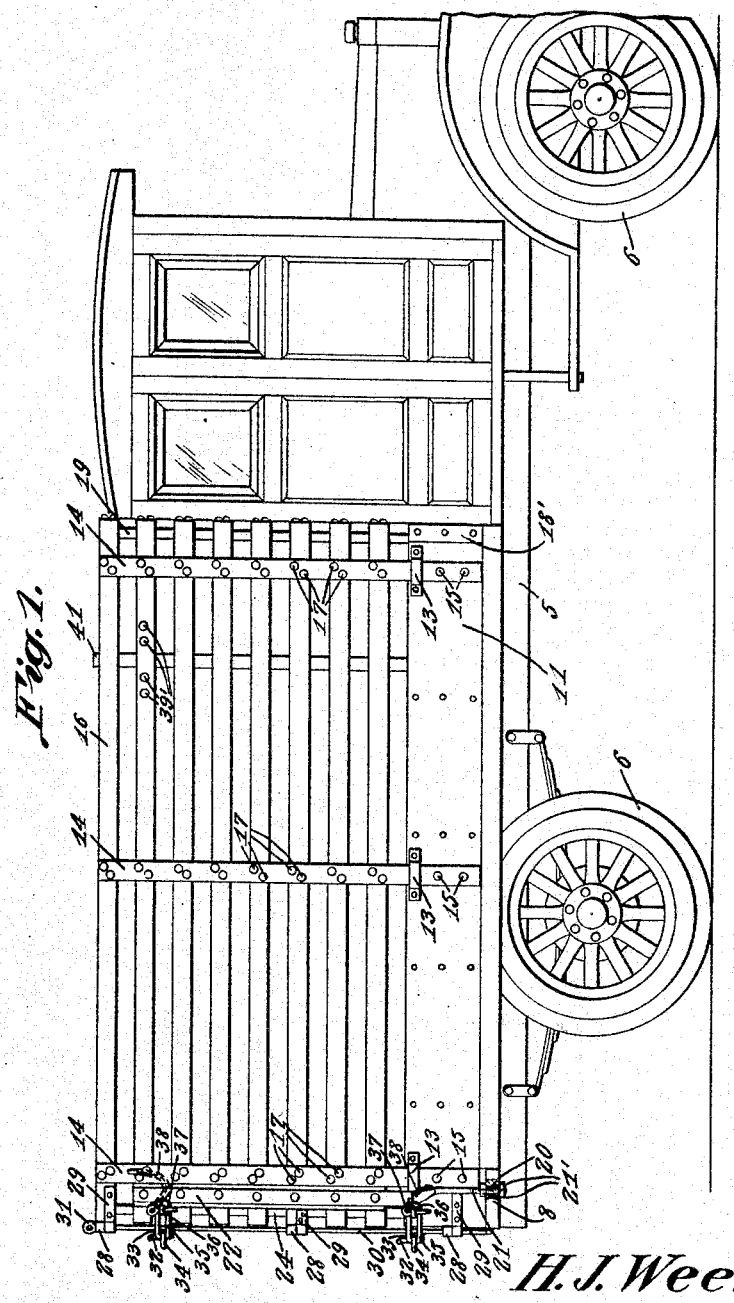
Figure 1 illustrates a side elevational view of a truck having a body constructed in accordance with my invention, secured thereto.
Figure 2:
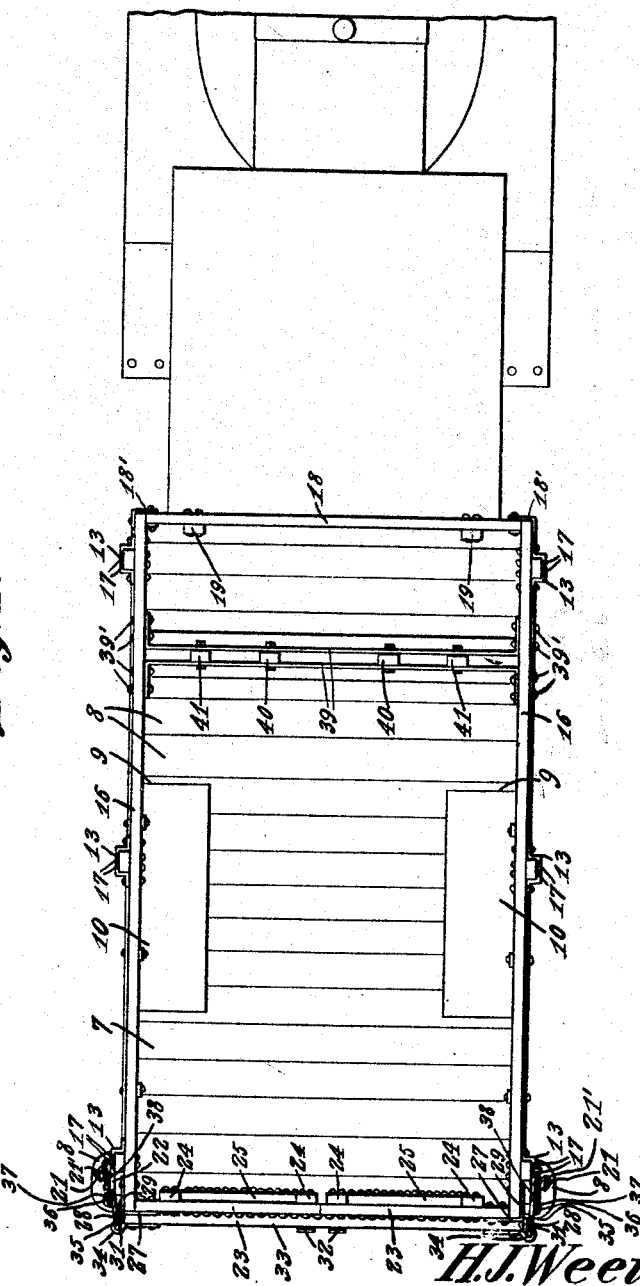
Figure 2 is a top plan view of the same.
Figure 3:
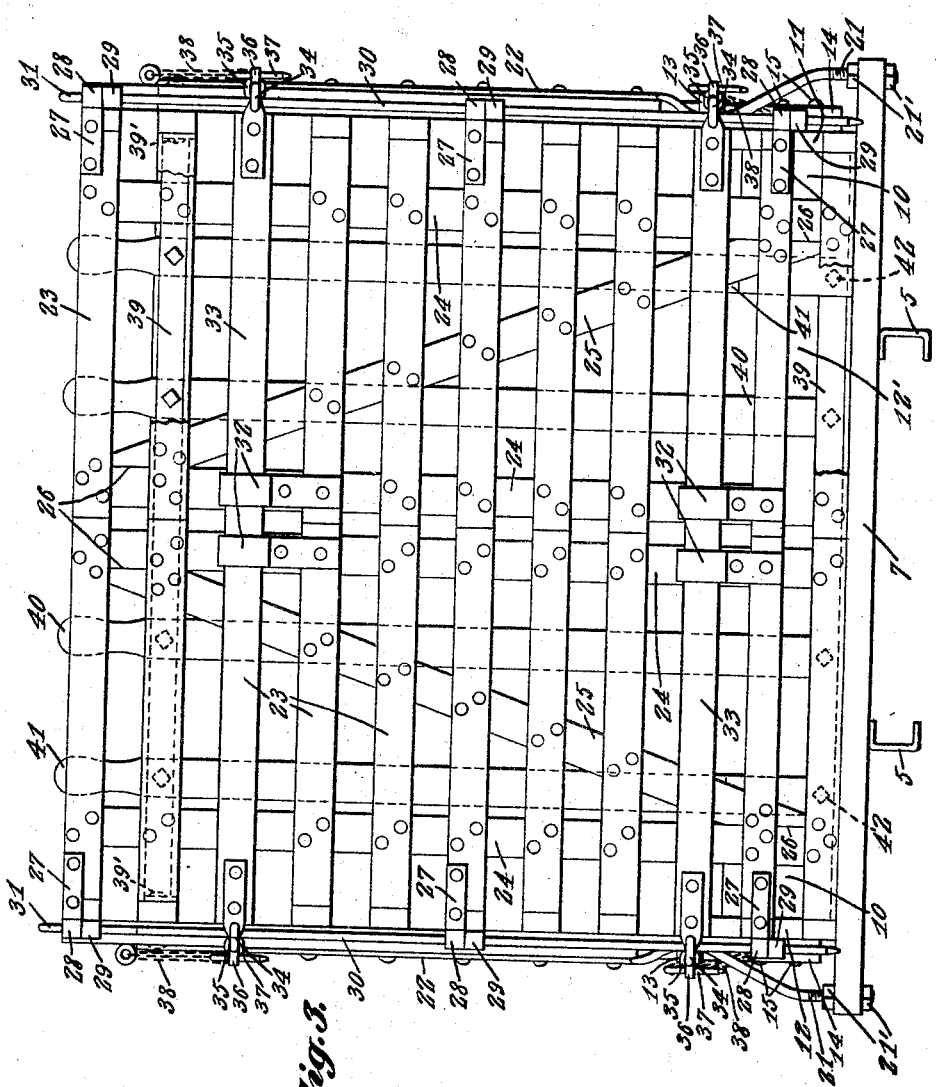
Figure 3 is a rear elevational view of the body.

Having reference to the drawings in detail the reference character 5 designates the parallel supporting beams of the chassis of a motor vehicle, on which is mounted the permanent body, which is supported by the usual wheels 6.

The floor 7 of the permanent body includes transversely extending boards 8 cut away as at 9 to provide a clearance for the wheels 6, such clearances being guarded by the curved metallic guard members 10 rigidly secured to the bottom, within the body, in any well known manner.

The side boards 11 and 12 are also secured to the bottom 7, and are connected at their forward ends by the end member 12′, which is of a height equal to the height of the side boards 11 and 12, of the permanent body.

Disposed adjacent the upper edges of the side boards 11 and 12, and secured thereto in spaced relation with each other, are the keepers 13, which receive the lower ends of the vertically extending connecting bars 14, the ends of said bars 14 which extend below the keepers 13, being bolted to the side boards 11 and 12 by means of the bolts 15.

Extending longitudinally of the permanent body, and secured to the connecting rods 14, in spaced relation with each other, are the side members 16 forming the sides of the auxiliary body, the same being connected to the vertically extending rods 14, by means of the bolts 17 passing therethrough.

The forward portions of the boards 11 and 12 are connected with the lowermost horizontal bar 18 at the forward end of the wagon body by means of the angle irons 18′.

As shown, the rear boards 8 of the floor 7 have their ends extending beyond the vertical plane of the side boards 11 and 12 of the permanent body, and are apertured as at 20, to receive the threaded ends of the rods 21, which have flattened portions 22, extending upwardly and having connection with the side members 16 for providing supplementary supporting means for the auxiliary body, direct with the main body of the truck, the threaded ends of rods 21 being held in position by the nuts 21′ positioned on the threaded ends thereof.

The end gate employed in connection with the auxiliary body includes a pair of hinged doors, each of which comprises transversely extending members 23, vertically extending connecting members 24, and diagonally disposed bracing members 25, the ends thereof being beveled as at 26 to engage the vertically extending connecting members 24.

Disposed along one edge of each of the doors, in spaced relation with each other, are the hinged members 27, each of which includes an eye 28 for purposes to be hereinafter more fully described.

These hinge members 27 cooperate with similar hinge members 29 secured to the side members 26, and receive the elongated pin 30 which as shown extends through the registering eyes of the hinge members 27, for pivotally connecting the doors to the side members, the pin 30 also having an eye 31 formed integral with its upper end to restrict the longitudinal movement of the pin 30, when the same is being positioned within the hinge members 27.

From the foregoing it will be seen that the doors forming the end gate, may be easily and quickly removed, in the event that the truck is backed to close to the pen from which the animals are to be removed, to allow for a clearance of the doors when the same are swung open on their hinges.

Disposed adjacent the abutting edges of the doors, are the keepers 32, said cleats being spaced from the top and bottom of each of the doors, and lying in such position that the locking bars 33 may be positioned therein, and thereby prevent the doors from being swung open.

The locking bars 33 comprise substantially long members, and having eye plates 34 bolted to the outer ends thereof adjacent the top and bottom, the eye plates adapted to support link members 35, which swing over the eye bolts 36, whereby the same are locked in such position by the pins 37 which extends through the eye bolts 36, such pins being carried by the body by means of the flexible members 38.

Disposed within the forward portion of the auxiliary body, are the spaced upper and lower stanchion bars 39 having their ends extending at right angles and bolted to the side members 16, as at 39'.

The stanchions proper include stationary bars 40 and pivoted bars 41, pivoted at their lower ends as at 42 to permit the same to be moved laterally of the stanchion bars 39 to allow the heads of animals to be positioned therein, the movable stanchion bars being then moved in position to lock the heads in the stanchions.

It will therefore be seen that the animals may be held within the auxiliary body with little danger of them crowding each other or getting out over the sides of the body.

Having thus described my invention, what I claim is:—

A removable body for wagons comprising vertically spaced side members, a pair of spaced stanchion bars having their ends connected to the side members adjacent to the upper edges thereof, stationary bars held between the stanchion bars, pivoted bars cooperating with the stationary bars to provide stanchions, and said stanchions adapted to be moved with the side members.

In testimony that I claim the foregoing as my own, I have hereto affixed my signature.

HARVEY J. WEETH.